March 17, 1970 W. B. HANSEL 3,500,862
QUICK-ACTING VALVE
Filed April 12, 1968 6 Sheets-Sheet 1
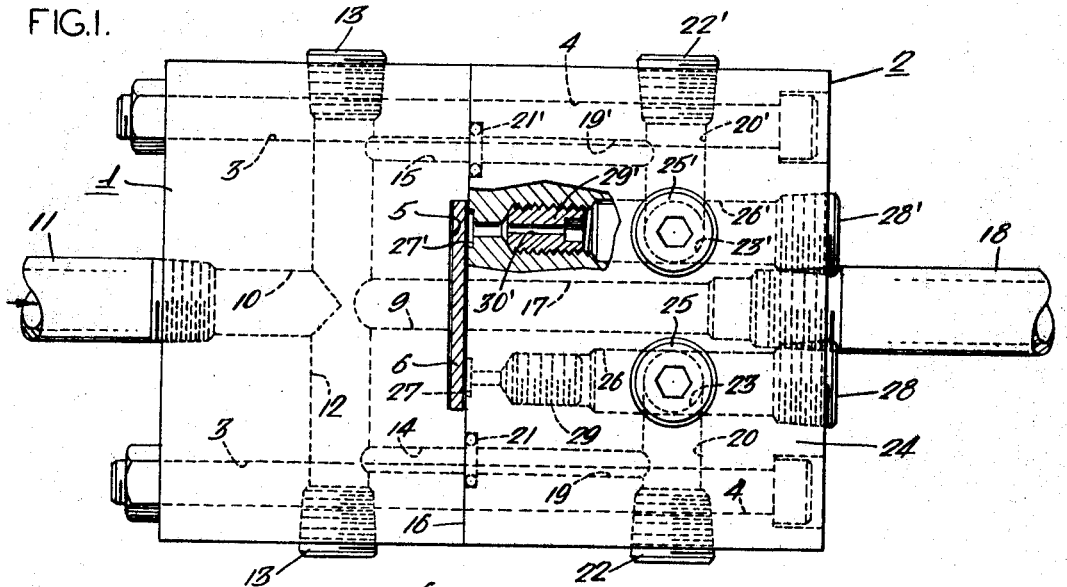
FIG.1.
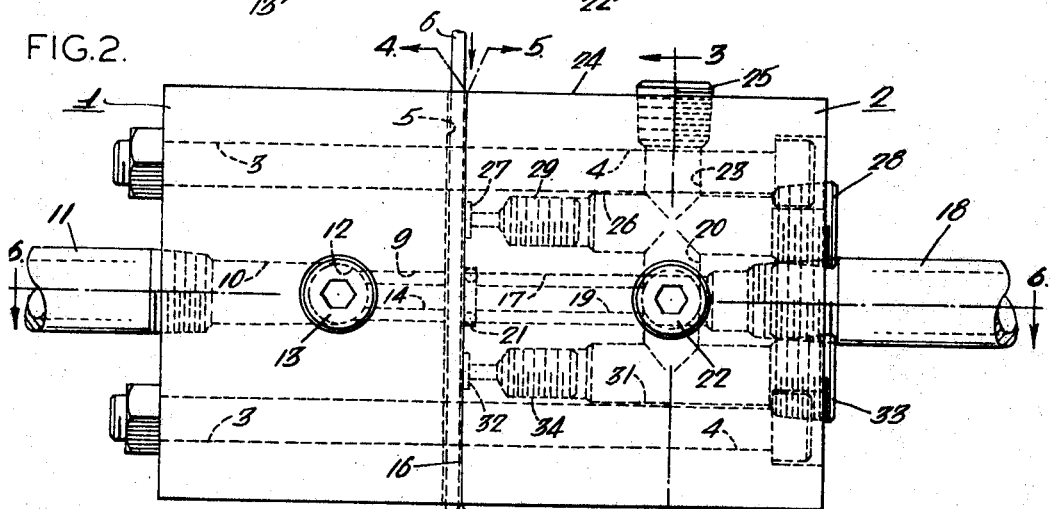
FIG.2.
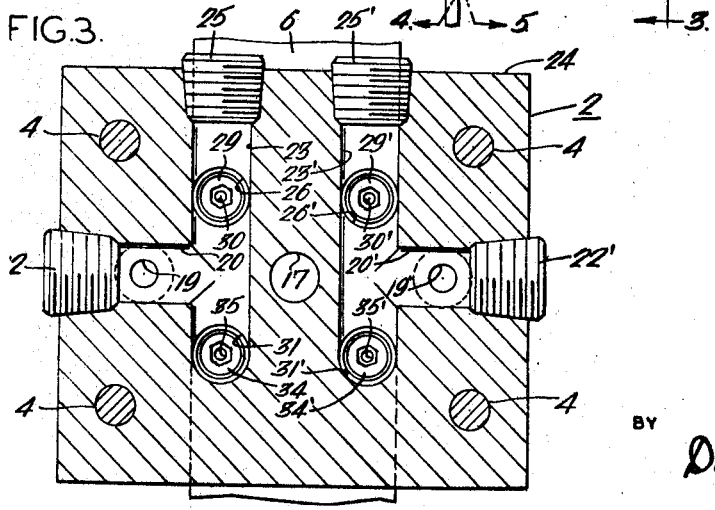
FIG.3.
FIG.1a.
INVENTOR:
WILLIAM B. HANSEL
BY Donald R. Johnson
ATTY.

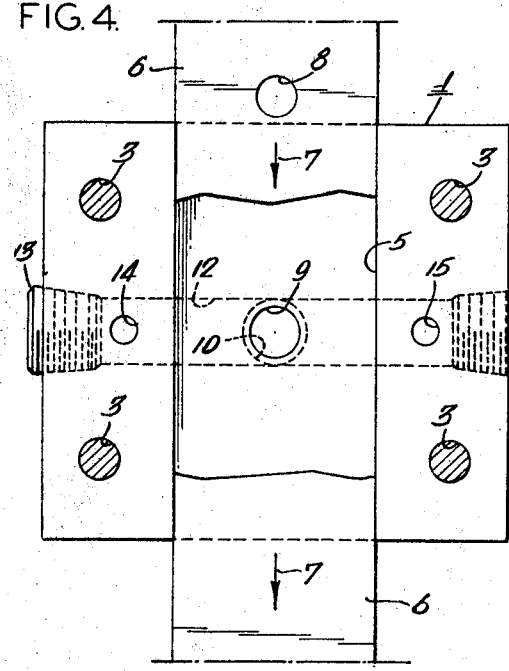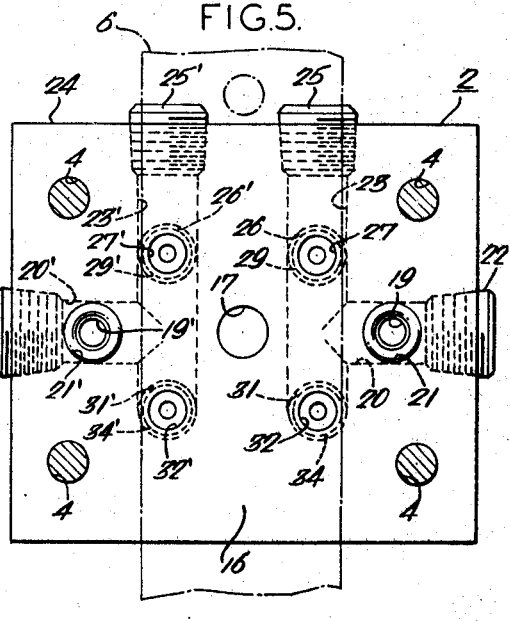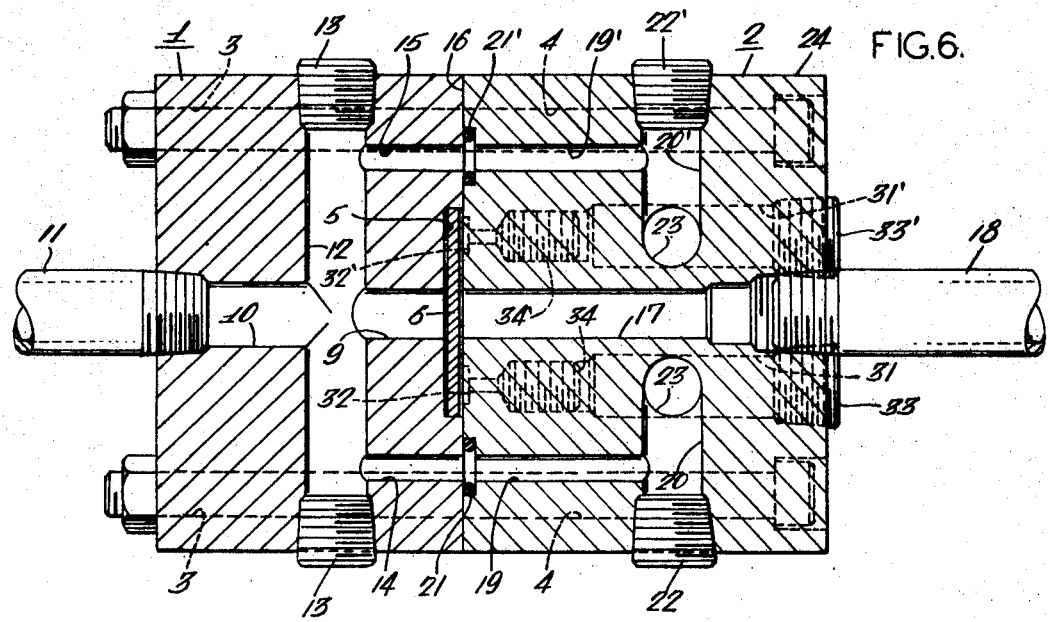

March 17, 1970  W. B. HANSEL  3,500,862
QUICK-ACTING VALVE

Filed April 12, 1968  6 Sheets-Sheet 3

INVENTOR:
WILLIAM B. HANSEL
BY
Donald R. Johnson
ATTY.

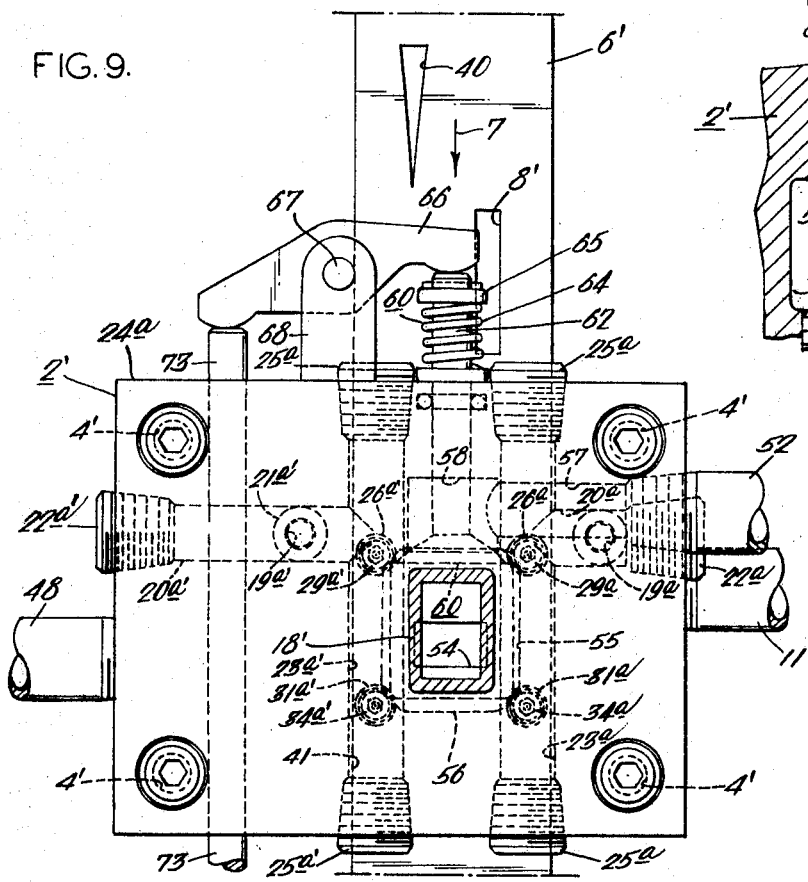

March 17, 1970   W. B. HANSEL   3,500,862
QUICK-ACTING VALVE

Filed April 12, 1968   6 Sheets-Sheet 5

INVENTOR:
WILLIAM B. HANSEL
BY
Donald R. Johnson
ATTY.

March 17, 1970  W. B. HANSEL  3,500,862
QUICK-ACTING VALVE

Filed April 12, 1968  6 Sheets-Sheet 6

INVENTOR:
WILLIAM B. HANSEL
BY Donald R. Johnson
ATTY.

United States Patent Office 3,500,862
Patented Mar. 17, 1970

3,500,862
QUICK-ACTING VALVE
William B. Hansel, Media, Pa., assignor to Sun Oil Company, Philadelphia, Pa., a corporation of New Jersey
Filed Apr. 12, 1968, Ser. No. 721,001
Int. Cl. G05g 21/00; G06k 7/02; F16k 13/00
U.S. Cl. 137—624.13
11 Claims

ABSTRACT OF THE DISCLOSURE

An impervious tape is driven at a high velocity between two aligned portions of a gas flow passage, the tape moving transversely with respect to the length of the passage. The tape has an aperture therein which comes into registry with the two passage portions to permit communication therebetween for opening of the valve. The tape is maintained centered in a small gap between the juxtaposed passage portions, as the tape moves, by the application of (oppositely-acting) gas pressures to the respective opposite faces of the tape.

---

This invention relates to a quick-acting valve of the on-off type. The valve has utility wherever an extremely fast-acting valve is called for. For example, it may be used in internal combustion engines, compressors, turbines, etc., as well as in various types of thermal engines. A typical application of the valve (which will be described in detail herein, merely for purposes of illustration) is for the valving of a suitable driving gas into a stationary hollow conduit, in order to set up shock waves therein.

It has been found that certain endothermic chemical reactions may be carried out by subjecting a reactant material to one or more mechanical shock waves, thereby to produce a high temperature in such material for a very short period of time. The shock waves may be produced in a hollow conduit, which may in some cases be termed a shock tube.

A wave reactor employing a shock tube may be used for many different chemical reactions. By way of example, hydrogen cyanide and acetylene may be prepared, using carbonaceous, hydrogenous, and nitrogenous material (such as a mixture of methane and nitrogen) as the reactant material. More specifically, it is possible to convert a mixture of natural gas (methane) and nitrogen into hydrogen cyanide and acetylene, by heating the reactant material quickly to temperatures above 3500° F., the heating to be almost immediately followed by cooling to a temperature not substantially greater than 1600° F., the cooling rate being comparable to the heating rate.

The required heating and cooling may be conveniently effected in a so-called shock tube. A shock tube is a pipe or hollow conduit in which a gas or a gas mixture (termed the reactant material) can be heated very rapidly to very high temperatures by another gas, the driving gas, adiabatic compression being the heating mechanism. That is to say, the process involves adiabatic compression of the reactant material by another gas, the driving gas, which latter works in a way similar to a mechanical piston. The heating is followed almost immediately by rapid cooling through expansion. If there is a sequence of equivalent independent shock tube processes, the result is essentially a continuous flow process. From the foregoing, it may be realized that the process utilized in the wave reactor involves at least the following steps: charging of reactant material into the hollow conduit, charging of driving gas (e.g., hydrogen) into the conduit, removal of driving gas from the conduit, and removal of reaction products from the conduit. In some cases, purging or flushing of the conduit (shock tube) might also be involved. The steps described call for some form of valving means, to valve the various materials to and from the reaction conduit in the proper sequence, and at the proper times.

In order to generate a shock wave as desired, the driving gas must be coupled very suddenly (i.e., very rapidly) to the shock tube. This calls for an extremey rapid valving action; the achievement of such a rapid action has in the past been a vexing problem.

An object of this invention is to provide a novel quick-acting valve.

Another object is to provide an improved quick-acting valve which operates mechanically, yet which does not involve any mechanical inertia.

One approach to the driving gas valving problem mentioned previously involves the use of rotating hollow conduits or shock tubes, with fixed or stationary valving or porting means.

A further object is to provide a fast-acting non-stationary valve which is more efficient than the stationary porting means just mentioned.

A still further object is to provide a novel fast-acting moving valve, which can be used for the purpose of valving driving gas to a stationary shock tube.

An additional object is to provide a valve which utilizes a moving tape.

The objects of this invention are accomplished, briefly, in the following manner: Two portions of a gas flow passage which are to be valved into and out of communication with each other, such as a tubular element conveying a gas under pressure and an elongated hollow conduit, are mounted in opposite sides of a block so that their respective adjacent ends are in alignment with each other and open into respective opposite sides of a channel formed in the block. An impervious tape, formed in the shape of an endless loop, is caused to move at a high velocity through the channel, in a direction transverse to the gas flow passage portions. The tape has an aperture therein which comes into registry with the open ends of the tubular element and of the conduit, thereby to bring them into communication with each other to "open" the valve. When the tape aperture has passed beyond the ends of the element and of the conduit, the valve is "closed." A hydrostatic-pressure pad is provided for the tape in the channel of the block, by means of passages in the block which connect the pressured-gas-conveying element to the hollow conduit side of the tape channel. Each of these latter passages has a "critical-flow" orifice therein.

A detailed description of the invention follows, taken in conjunction with the accompanying drawings, wherein:

FIG. 1 is a plan view of a basic valve block assembly according to the invention, with a portion thereof broken away;

FIG. 1a is a fragmentary sectional view illustrating a modification of the broken-away portion of FIG. 1;

FIG. 2 is a side elevation of the block assembly of FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2;

FIG. 6 is a sectional view taken on line 6—6 of FIG. 2;

FIG. 9 is an end elevation of the block assembly of FIG. 7;

FIG. 10 is a fragmentary section taken on line 10—10 of FIG. 8;

FIG. 11 is a sectional view taken on line 11—11 of FIG. 8;

FIG. 12 is a fragmentary section taken on line 12—12 of FIG. 8;

Figure 7:
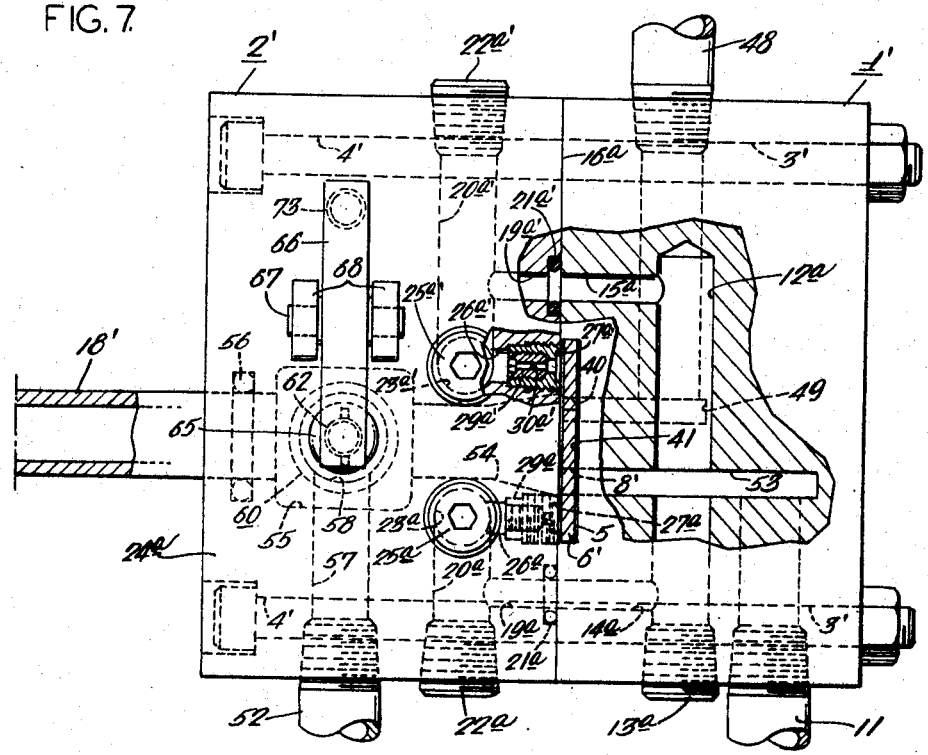
FIG. 7 is a plan view of a modified valve block assembly, of the type utilized in the wave reactor system of FIG. 13.
Figure 8:
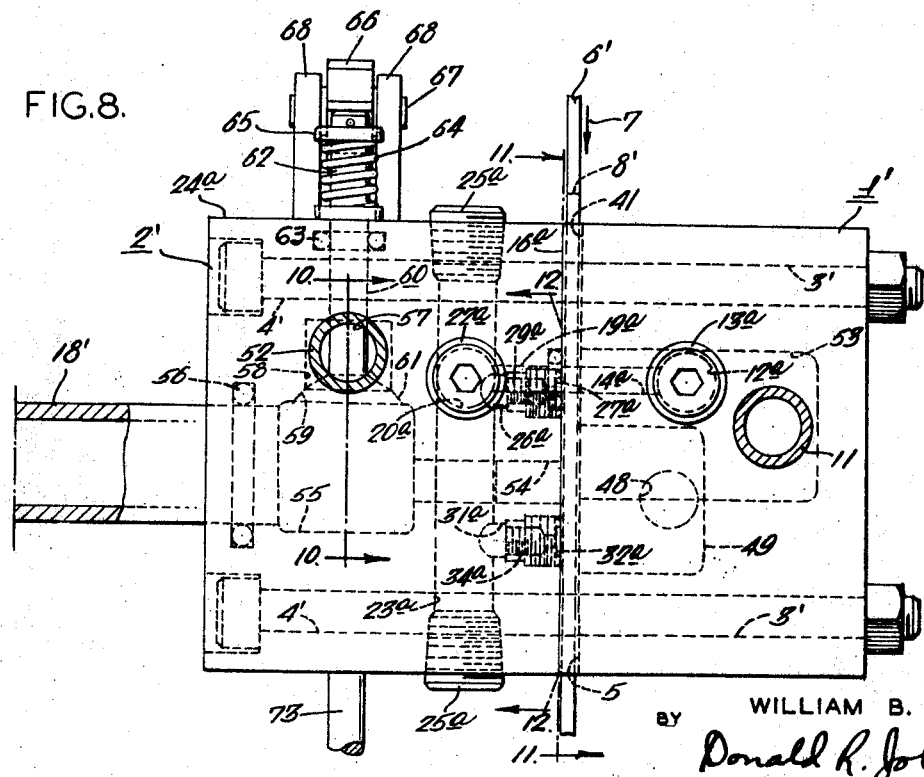
FIG. 8 is a side elevation of the block assembly of FIG. 7.

Refer first to FIGS. 1–6, which illustrate the construction of a quick-acting or fast-acting valve according to this invention. A generally prismoidal valve block assembly is composed of a prismoidal inlet block 1 and a prismoidal outlet block 2, which during operation are held in assembled face-to-face relation by means of four bolts which pass freely through respective aligned corner holes 3 and 4 in the inlet and outlet blocks 1 and 2, respectively, these holes passing entirely through the respective blocks. The aforementioned bolts have heads at one end, and at their opposite ends have nuts which threadedly engage the shanks of the bolts.

In that (inner) face of inlet block 1 which engages a matching (inner) face 16 of the outlet block 2 when the blocks 1 and 2 are in assembled relationship, there is formed a shallow groove 5 which is U-shaped (but with square corners) in cross-section (see FIGS. 1 and 6), this groove extending throughout the entire height of block 1 so as to constitute a channel when the blocks 1 and 2 are assembled. It should be apparent that the planar face 16 of outlet block 2 forms a fourth side for the channel when the blocks 1 and 2 are in assembled relationship, thus completing a slot. By way of example, the groove 5 may be 36 mils deep and slightly over an inch in width, with a length (equal to the height of block 1) of two inches. An impervious tape 6, in the form of an endless loop of tape having a width which is large as compared to its thickness, is positioned in the channel 5 and is driven at a high velocity (on the order of ten to fifteen thousand feet per minute, for example, or about 113 to about 170 miles per hour) in the direction of arrows 7 (that is, down through channel 5, in the lengthwise direction) by a suitable means which is not shown in FIG. 1, but which will be described hereinafter. That is to say, the tape 6 moves downwardly through the rectangular slot which is formed when the blocks 1 and 2 are fastened together. Since the tape 6 is in the form of an endless loop, it must be stated here that its thickness and its flexibility should be such as to allow it to pass over pulleys of reasonable diameter, located above and below the block 1.

As previously mentioned, the tape 6 is impervious, but it does have at least one small aperture 8 therein which is preferably located centrally with respect to the side edges of the tape. This aperture will be further referred to hereinafter.

A central gas flow passage extends throughout the length of inlet block 1. This gas flow passage includes a cylindrical bore 9 one end of which opens into the inner wall of block 1 which defines the base of groove 5, and also (axially aligned with bore 9 and communicating with the other end thereof) a somewhat larger-diameter bore 10 which is provided with pipe threads at its outer end. One end of a tubular element (pipe) 11, which during valve operation is connected at its other end to a pressured gas source and is thus adapted to convey gas under superatmospheric pressure, is threaded into the outer end of bore 10.

At the junction between bores 9 and 10, block 1 has formed therein a horizontal transversely-extending cylindrical passage 12 which intersects bore 10 and thus communicates therewith. Preferably, the axis of passage 12 lies in the same horizontal plane as does the common axis of bores 9 and 10; bore 10 opens into one side of passage 12 and bore 9 opens into the diametrically-opposite side of this passage. The axis of passage 12 lies at 90° to the common axis of items 9 and 10. For ease of machining, passage 12 extends completely through block 1, from one side to the other thereof, the respective opposite ends of this passage being provided with pipe threads into which are screwed respective pipe plugs 13 which close off the ends of the passage. Two bores 14 and 15 extend outwardly from the inner face of block 1 into communication with transverse passage 12, one near each end of this passage; these bores are located beyond the confines of groove 5, one on either side thereof. The center lines of all of the cylindrical openings 9, 10, 12, 14, and 15 lie in a common horizontal plane (see FIG. 4), which is the horizontal midplane of block 1. The bores 14 and 15 are of smaller diameter than is bore 9, and by way of example may have a diameter one-half that of bore 9.

It may be noted here that when a pressured gas such as a driving gas is conveyed by way of pipe 11 to the block 1, this pressure is communicated by way of the various intercommunicating internal channels of block 1 to the several bores 9, 14, and 15, and this pressure appears at the inner ends of these bores. The gas pressure is exerted in the direction toward block 2 and the pressure exerted through bore 9 (acting on tape 6) tends to push this tape toward block 2.

It has previously been stated that the blocks 1 and 2 are assembled in face-to-face relationship; this means that the inner grooved face of inlet block 1 is adjacent or juxtaposed to the inner flat or planar face 16 of outlet block 2. A central cylindrical bore 17, axially aligned with bore 9, extends entirely through block 2, from the inner face 16 to the outer face thereof. Bore 17 has the same diameter as bore 9, and the inner end of bore 17 opens into the slot formed in the block assembly 1, 2 by the combination of groove 5 and the planar face 16 of block 2. It may be noted here that the bores 17 and 9 open into opposite vertical faces of the slot to which reference was just made, and thus these bores are on opposite sides of tape 6 as the latter travels downwardly through this slot. It may be seen that the bores 9 and 17 are adapted to constitute two aligned portions of a gas flow passage.

The outer end of the straight cylindrical bore 17 is provided with pipe threads, and one end of an elongated hollow cylindrical conduit 18 (which may be a shock tube, in which a shock wave is set up when the on-off valve of this invention is turned "on") is secured to the outlet block 2 by means of these threads. The conduit 18 is axially aligned with bore 17, and also with bore 9 in block 1. The I.D. of conduit 18 is preferably equal to the diameter of bore 17, and said one end of this conduit communicates directly with bore 17.

Assume that the tubular element 11 is connected to a pressured gas source, such as a source of driving gas under superatmospheric pressure. During the time when the unapertured area of tape 6 is passing between bores 9 and 17, this impervious tape seals off bore 17 from bore 9, and the valve is "off" or closed.

The tape aperture 8 is so located that is can come into registry with bore 9 (and also with the axially aligned bore 17) as the tape moves through the slot formed in the block assembly 1, 2. Each time that this occurs, the tubular element 11 is very suddenly (since the tape 6 is moving at a very high velocity, and since the tape aperture 8 is small) coupled to or brought into communication with the interior of conduit 18, by way of bore 9, tape aperture 8, and bore 17. The driving gas being conveyed by element 11 is then suddenly applied to the interior of conduit 18, to set up a shock wave therein. When the tape aperture 8 is in registry with bores 9 and 17 as just described, the quick-acting or fast-acting valve of this invention is "on" or open.

Since the aperture 8 is small and the speed of tape 6 is high, the time duration of each "on" condition of the valve is short, which is to say that the duration of each completion of a passage through the valve is short. Each "on" condition thus creates a short high pressure pulse of gas in the conduit 18, setting up a shock wave therein.

According to this invention, the tape 6 is held in an equilibrium position in the slot through which it passes, the tape not touching either the inlet or outlet sides thereof. This is done by controlled gas leakage on both faces of the tape, which in effect hydrostatically establishes a thin gas film at each face of the tape. Such films may be thought of as hydrostatic pads. The means for effecting the previously-mentioned result will now be described.

Before describing the aforesaid means, however, it may be noted that, when the tape 6 is moving with respect to the block assembly 1, 2, wedges of gas (air, or whatever other ambient surrounds the block assembly) are hydrodynamically (due to the relative movement of the tape with respect to the block assembly) forced between each face of the tape and the adjacent surface of the slot through which the tape passes. These hydrodynamically-produced wedges, in effect, increase the stiffness of the aforementioned hydrostatic pads.

Outlet block 2 has formed therein a cylindrical passage 19 which is adapted to come into axial alignment with bore 14 when the blocks 1 and 2 are assembled together. Passage 19 extends horizontally from face 16 of block 2 toward the outer face of this block for a distance of approximately one-half the length of the block, the interior end of this passage opening into the side wall of a short transversely-extending cylindrical passage 20 which extends inwardly from the adjacent (left-hand in FIG. 3) side face of block 2 toward the center thereof. The face 16 end of passage 19 is preferably counterbored as at 21 to a larger diameter, the depth of this counterbore being quite small (e.g., 40 mils). This counterbore provides an annular groove for accommodating an O-ring. The outer end of passage 20 is provided with pipe threads into which a pipe plug 22 is screwed to seal this end of the passage. Passage 19 opens into passage 20 at a location slightly inwardly from the aforementioned pipe threads.

The inner end of passage 20 opens into the side wall of a vertically-extending cylindrical passage 23, at a point intermediate the ends of the latter. Passage 23 extends vertically from the upper face 24 of block 2 toward the bottom of this block, and at its upper end is provided with pipe threads into which a pipe plug 25 is screwed to seal this end of the passage.

Outlet block 2 also has therein a horizontally-extending cylindrical passage 26 which extends entirely through the block, from face 16 thereof to the (outer) block face opposite to face 16. The end of passage 26 which opens into face 16 is preferably counterbored as at 27 to a larger diameter, the depth of this counterbore being very small (e.g., one mil or less). For a short distance toward the outer face of block 2 from the bottom of this counterbore, the passage 26 preferably has a reduced diameter. The center of passage 26 is located on a circle whose center coincides with the center of bore 17 (and also with the geometric center of face 16), and whose radius is such that the reduced-diameter end of passage 26 opens into the outlet side of the slot through which tape 6 passes, the outlet side being, of course, the same side of this slot as that into which bore 17 opens. The center of passage 26 is located 45° around (in the clockwise direction, looking at face 16 as in FIG. 5) from a vertical line passing through the center of bore 17, this described location of the center of passage 26 on face 16 being such that the tape aperture 8 will not uncover passage 26 as the tape travels through its slot in the block assembly, but passage 26 will always "look at" the imperforate portion of the "outlet" face of tape 6. The passage 26 in effect passes completely through the passage 23, near the upper end of the latter, at a location slightly inwardly from the pipe threads at such upper end; thus, the passage 26 communicates directly with passage 23. At its outer end, passage 26 is provided with pipe threads into which a pipe plug 28 is screwed to seal this end of the passage.

Assume that blocks 1 and 2 are assembled together for operative purposes. When a pressured gas source is coupled by means of pipe 11 to block 1, a small (low-rate) leakage gas flow takes place through bore 10, transverse passage 12, bore 14, the axially aligned passage 19, transverse passage 20, vertical passage 23, horizontal passage 26, and an orifice 30 (which is in passage 26; see FIG. 3) into the outlet side of the tape slot. This gas flow results in a hydrostatic pressure force applied to the outlet side of tape 6 which opposes the hydrostatic pressure force applied to the inlet side of the tape as a result of the leakage gas flow through bores 10 and 9, the term "leakage" here applying, of course, to the gas flow which takes place when tape aperture 8 is not in registry with bore 9. In this connection, it is desired to be pointed out that the diameter of bore 9 is larger than those of bores 14 and 19; for example, bore 9 may have a diameter of ¼ inch, while bores 14 and 19 may have a diameter of ⅛ inch.

Between passage 23 and block face 16, passage 26 has a set of internal threads in which is threadedly mounted a cylindrical insert 29 carrying a small orifice 30 (see FIG. 3) sized to establish critical flow conditions therethrough. That is to say, the orifice 30 is sized to act as a critical-flow orifice. In the design of the valve assembly which is an optimum (and which will be hereinafter described, in connection with FIG. 1a), the orifice 30 is quite close to block face 16.

Critical flow takes place through an orifice when the ratio of the pressure downstream of the orifice to the pressure upstream thereof is equal to or less than a "critical ratio," which has a value of approximately 0.53 (53%) for gas. The aforementioned "critical ratio" is that at which acoustic velocity of the gas flow is attained in the throat of the orifice. The establishment of the "critical flow" phenomenon through orifice 30 entails the result (if the orifice 30 is close to the block face 16) that any reduction in the pressure downstream of the orifice (i.e., on the side of the orifice toward block face 16, or toward the tape 6) has no effect on the flow rate through the orifice.

The lower end of passage 23 opens into the side wall of a horizontally-extending cylindrical passage 31 which extends entirely through the block 2, from face 16 thereof to the (outer) face opposite to face 16. The end of passage 31 which opens into face 16 is preferably counterbored as at 32 to a larger diameter, counterbore 32 being similar to counterbore 27, previously mentioned. For a short distance toward the outer face of block 2 from the bottom of counterbore 32, the passage 31 preferably has a reduced diameter. The center of passage 31 is located on the same circle as is the center of passage 26, and as a consequence the reduced-diameter end of passage 31 also opens into the outlet side of the tape slot. The center of passage 31 is located 90° around (in the clockwise direction, looking at face 16 as in FIG. 5) from the center of passage 26. Passage 31, like passage 26, is not uncovered by tape aperture 8 as the tape 6 travels through its slot, the passage 31 always "looking at" the imperforate portion of the "outlet" face of the tape. At its rear end, passage 31 is provided with pipe threads into which a pipe plug 33 is screwed to seal this end of the passage.

Between passage 23 and block face 16 (preferably, just to the rear of the reduced-diameter end of passage 31), passage 31 has a set of internal threads in which is threadedly mounted a cylindrical insert 34 carrying a small orifice 35 (see FIG. 3) sized to establish critical flow conditions therethrough. Orifice 35, in other words, is sized to act as a critical-flow orifice. In the optimum design, orifice 35, like orifice 30, would be close to block face 16. See FIG. 1a.

When blocks 1 and 2 are joined togeher to form a block assembly as previously described, the small leakage gas flow reaching passage 23 from passage 20 splits, the portion of this flow which does not proceed upwardly (in passage 23) proceeding downwardly (in passage 23) into passage 31 and thence flowing through this latter passage and through orifice 35 into the outlet side of the tape slot. This last-mentioned gas flow, like that traveling through passage 26, results in the application of a hydrostatic pressure force to the outlet side of tape 6.

There has been described previously an arrangement of interconnected passages in block 2 which are fed from bore 14 in block 1, and which terminate in the two passages 26 and 21 both located on the same side (to wit, the lefthand side in FIG. 3) of a vertical line passing through the center of bore 17. An exactly similar but mirror image arrangement of interconnected passages is provided in block 2, for two passages 26' and 31' both located on the other side (to wit, the right-hand side in FIG. 3) o fa vertical line passing through the center of bore 17. Elements of the latter or right-hand arrangement which are similar to those of the left-hand arrangement are denoted by the same reference numerals, but carrying prime designations. This latter or right-hand arrangement of passages is fed from bore 15 in block 1, and provides gas flow from the passages 26' and 31' into the outlet side of the tape slot. The centers of passages 26, 31, 26', and 31' are all located on the same circle, the center of passage 26' being located 90° around (in the same counterclockwise direction) from the center of passage 26'.

Passages 26' and 31', like passages 26 and 31 previously mentioned, are not uncovered by tape aperture 8 as the tape 6 travels through its slot; the passages 26' and 31' always "look at" the imperforate portion of the "outlet" face of the tape.

A separate critical-flow orifice, similar to the respective orifices 30 and 35 previously mentioned, is provided in each of the passages 26' and 31'.

It may be seen that the hydrostatic pressure force which is exerted on the "inlet" side of the tape 6 by the leakage gas issuing from bore 9, and which tends to push the tape toward the "outlet" block 2, is opposed by the hydrostatic pressure force exerted by the leakage gas issuing from passages 26, 31, 26', and 31', which latter force tends to push the tap toward the "inlet" block 1. The parameters of the design are such that these two opposing forces are substantially equal, so that the tape 6 is held in an equilibrium position in its slot as it passes therethrough, not touching either the inlet block 1 or the outlet block 2. This was proven in an actual device which was built according to the invention and successfully tested; in this actual device, the thickness of the tape slot was less than one mil (0.001 inch) greater than that of the tape itself. In this device, the tape did not touch either the inlet block or the outlet block as it traveled through its slot.

Since the hydrostatic pressure forces applied to the two sides of the tape are equal and are derived from the same source (namely, the pressured gas source connected at 11 to the inlet block 1), changes in the pressure of this source are applied equally to the two sides of the tape and thus produce no net movement of the tap in the direction toward either of the two opposite walls of the tape slot.

The previously-described centering action produced on the tape (whereby the tape is centered in the tape slot, relative to the thickness dimension) is essentially static in nature. There is also a dynamic centering action produced by the critical-flow orifices 30, 35, 30', and 35'. These critical-flow orifices are an important feature of the invention. The critical-flow orifices dampen and control the tape motion; without them, the centering action produced on the tape would be slow, and the tape would flutter back and forth in its slot. The critical-flow orifices allow the tape-centering action to take place with large pressure differentials across the tape.

The arrangement of the critical-flow orifices is very important to provide an effective and efficient tape-centering action. A preferred (perhaps the optimum) arrangement is illustrated in FIG. 1a, which illustrates one of the passages (to wit, passage 26') in block 2, this passage having a critical-flow orifice 30" at the inner end of the passage, and quite close to block face 16. FIG. 1a illustrates a modification of the broken-away portion of FIG. 1, and is typical of the arrangement of the four critical-flow orifices in the "preferred" design. The stiffness of the tape gas bearing or pad (which is the major factor affecting the characteristics of the tape-centering action) is a function of the volume of air (or other gas) between the tape 6 and the critical-flow orifice 30", so this volume should be very small. This volume can be made small by making the recess or counterbore 27' very shallow (one mil or less deep), and by placing the critical-flow orifices 30" as close to the recess as possible. It may be noted here that in the FIG. 1a arrangement the threaded inserts such as 29' are not used, and the critical-flow orifices (such as 30") are placed directly in the bottoms of the respective passages (such as 27').

If, now, the tape 6 tends to move away from the inlet block 1 (and toward block 2), the volume of the very-small-volume recess or pocket 27' is reduced or compressed. This causes a buildup or increase in the pressure on the block 2 side of the tape, creating a pressure imbalance wherein the higher pressure on the block 2 side tends to move the tape back toward the inlet block 1.

Aiding the above, when the tape tends to move away from the inlet block 1 the pressure in the gap between the tape and this block is momentarily reduced, due to a momentary increase in the gap thickness. This enhances or increases the pressure imbalance which tends to move tape 6 back toward inlet block 1.

If the tape tends to move away from the outlet block 2 (and toward block 1), the volume of air (or other gas) between the tape 6 and the critical-flow orifice 30" is increased. This increase in volume results in a sharp decrease in the pressure on the block 2 side of the tape (since the flow through the critical-flow orifice 30" cannot change), creating a pressure imbalance wherein the lower pressure on the block 2 side tends to allow the tape 6 to move back toward the outlet block 2. In this case, the higher pressure is on the block 1 side, which causes movement of the tap back toward block 2.

Aiding this last-mentioned action, when the tape tends to move toward the inlet block 1 the pressure in the gap between the tape and this block is momentarily increased, due to a momentary decrease in the gap thickness. This enhances or increases the pressure imbalance which tends to move tape 6 back toward outlet block 2.

It is pointed out that the bores 9 and 17, as well as the shock tube 18 and the tape aperture 8, have been indicated as circular in cross-section or shape, but this is merely for purposes of illustration. The conduit 18 can have other cross-sectional shapes, such as square or rectangular, and the bores 9 and 17 would then have cross-sections matching that of the hollow conduit (shock tube) 18, and the tape aperture would have a similar shape. The same type of valving action occurs with these other cross-sectional shapes, the traveling tape 6 operating to cause the transmission of pressure pulses (by means of the aperture 8) from a zone on one side of the tape (this zone comprising the inlet block 1, for example) to a zone on the opposite side of the tape (this latter zone comprising the outlet block 2, for example).

Figure 13:
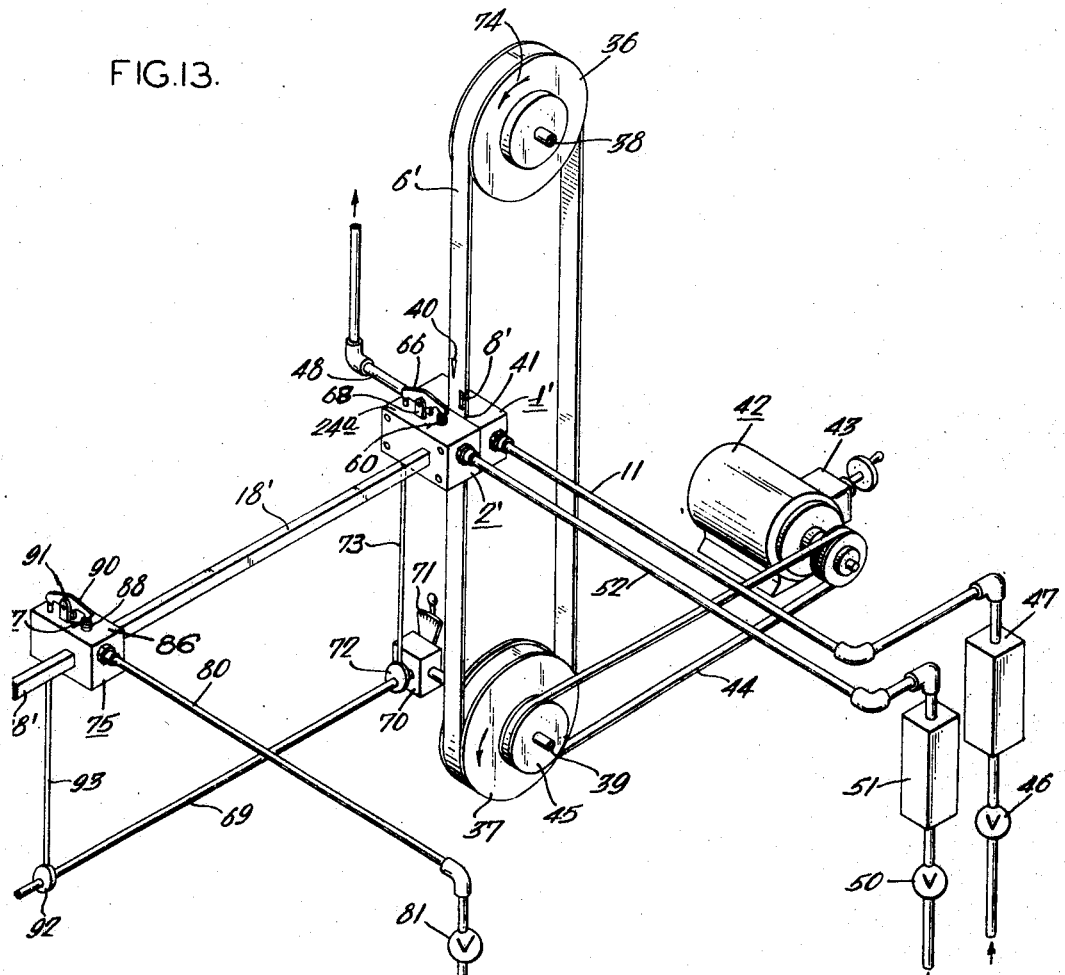
FIG. 13 is a diagrammatic view of a wave reactor system utilizing the modified form of valve block assembly.

It has been indicated previously that the quick-acting valve of this invention has utility in a wave reactor system, for the valving of driving gas into a stationary hollow conduit operating as a shock tube in a wave reactor. Refer now to FIG. 13, which is a somewhat schematic representation of a wave reactor system of the aforementioned type. One end of a stationary horizontally-extending hollow conduit 18', illustrated as being of rectangular cross-section, is mounted in a block assembly consisting of an inlet block 1' and an outlet block 2' which are held in assembled relation in any suitable manner, such as that previously described in connection with FIGS. 1-6. The block assembly 1', 2' is generally similar to block assembly 1, 2, although it differs therefrom in several respects, as will be come apparent hereinafter in connection with FIGS. 7-12.

A length of tape 6' in the form of an endless loop is adapted to pass over a pair of vertically-spaced pulleys 36 and 37 carried by respective shafts 38 and 39 which are journaled for rotation in any suitable manner, the direction of rotation being indicated by arrow 74. One side of the tape loop 6' passes down through a slot 41 in the block assembly 1', 2' which is similar to the tape slot provided in block assembly 1, 2. Tape 6' has at least one aperture 8' therein, and may also have therein another aperture 40 which will be further referred to hereinafter. The slot 41 in the block assembly 1', 2' is located at the abutting faces of the individual component blocks 1' and 2'. As illustrated in FIG. 13, the shafts 38 and 39 may typically be horizontal, with the pulleys 36 and 37 spaced vertically on respective opposite sides of the block assembly 1', 2' and the pulleys being so positioned that the tape 6' moves in a straight line down through the slot 41.

The tape lop 6' is driven at a high lineal speed over and around the two pulleys 36 and 37 by means of a drive motor 42, which is preferably an electric motor indicated as having a manually-adjustable speed control 43. By means of a drive belt 44, motor 42 drives a pulley 45 which is fastened to shaft 39 and thus also to a pulley 37. Pulley 37 thus comprises the driven pulley of the tape driving mechanism, which latter causes the tape loop 6' to pass in a continuous manner downwardly through the slot 41, at a suitably high velocity.

The pressured driver gas (which may be hydrogen at a superatmospheric pressure, by way of example) is supplied from a suitable source through a valve 46 and a flowmeter 47 (indicated as being of the rotameter type) to the pipe 11, which leads to the inlet block 1' in a manner rather similar to that previously described in connection with FIGS. 1-6.

As described hereinabove, each time that the tape aperture 8' passes through the block assembly 1', 2' a pressure pulse of gas is transmitted from the driving gas source to the hollow conduit (shock tube) 18', which pulse sets up or establishes a shock wave in this conduit.

The process utilized in wave reactor 18' may be generally similar to that disclosed in my prior Patent No. 3,357,797, dated Dec. 12, 1967. Thus, the wave reactor 18' may operate "double-ended," which means that at the opposite end (not shown) of this elongated conduit there would be another quick-acting valve which could be a mirror image of the one illustrated in FIG. 13. This other quick-acting valve would include an impervious but apertured loop of tape similar to tape 6', together with a block assembly duplicating that illustrated at 1', 2'; the tape at the opposite or far end of conduit 18' would ordinarily be driven in strict synchronism with tape 6', as by means of the same drive motor 42.

In addition to the aperture 8', tape 6' preferably also has an additional aperture 40 therein, which is spaced laterally (in the direction of the width of the tape) from aperture 8' so that aperture 40 can come into registry with a separate, individual channel 49 provided in inlet block 1'; however, on the opposite or "outlet" side of the tape, aperture 40 (like aperture 8') can register with the interior of the conduit 18'. Thus, aperture 40 can cause the interior of the conduit 18' to come into communication with channel 49 in inlet block 1', which channel is separate from the channel 53 carrying the driving gas. One end of a pipe 48 is sealed into inlet block 1' and into communication with one end of the channel 49 therein. Pipe 48 extends away from inlet block 1' and serves as a driving gas withdrawal or driving gas expansion connection.

Refer now to FIGS. 7-12, which illustrate the details of construction of the block assembly 1', 2'. The inner end of driving gas pipe 11 is sealed into a side wall of inlet block 1' and into communication with one end of an internal channel 53 therein, which latter corresponds in general to bore 9 in FIGS. 1-6. Channel 53 has a rectangular cross-section, as illustrated in the drawings, and extends generally parallel to the length of conduit 18'; the end of channel 53 opposite to said one end opens into tape groove 5, which forms a part of the tape slot 41. Tape groove 5, as previously described, is in that wall of inlet block 1' which abuts outlet block 2' when these two blocks are fastened together to form the block assembly.

Channel 49 has a rectangular cross-section and, like channel 53, extends generally parallel to the length of conduit 18'. One end of channel 49 opens into tape groove 5, and its other end communicates with pipe 48, which is sealed into that side wall of block 1' which is opposite to pipe 11. It may be seen that, in block 1', the channels 49 and 53 are entirely separate from each other.

On tape 6', the lateral spacing between apertures 8' and 40 corresponds to that between channels 53 and 49 in block 1'; as tape 6' passes downwardly through its slot 41 in the block assembly 1', 2', aperture 8' is adapted to come into registry with the inner end of channel 53 to valve the driving gas into conduit 18' and set up a shock wave, and then (a short time after aperture 8' has passed beyond the lower edge of channel 53) aperture 40 comes into registry with channel 49, to establish communication between conduit 18' and this latter channel, thus beginning the expansion portion of the cycle. (Aperture 40 is spaced from aperture 8', in the direction of the tape length, so that the actions just described follow each other in the proper time sequence.)

A horizontally-extending channel 54, of rectangular but non-uniform cross-section, is provided in block 2', this channel extending from face 16 of this block (face 16 being the face thereof which forms a part of the tape slot 41 when the blocks 1' and 2' are in assembled relationship) toward the opposite face thereof. Thus, one end of channel 54 opens into the tape slot 41. Channel 54 is of larger cross-section at this one end than at its other end. At said one end, the longer side of the rectangle (cross-section of channel 54) extends horizontally, and the length of this longer side is such that this channel would (absent tape 6') extend across both of the channels 49 and 53 of block 1'.

The other (smaller cross-section) end of channel 54 opens into an internal chamber 55 formed in block 2'. Chamber 55 may have (although it does not necessarily have to have) somewhat larger internal cross-sectional dimensions than the conduit (shock tube) 18'. One end of the shock tube 18' is sealed (as by means of an O-ring 56) into the wall of block 2' opposite to the tape slot 41, that is, into the wall of this block which is opposite to the face of block 2' which abuts block 1' when the blocks 1' and 2' are fastened together into an assembly. This end of the elongated hollow conduit 18' communicates with the chamber 55.

It may be seen that when tape aperture 8' uncovers the open end of channel 53, the driving gas supply pipe 11 communicates with conduit 18' by way of channel 53, channel 54, and chamber 55; this causes a shock wave to be set up in conduit 18', in the manner previously described. While tape aperture 8' is thus uncovering the end of channel 53, channel 49 is substantially sealed off from conduit 18' by means of tape 6', since the latter has no aperture therein in lateral alignment with aperture 8'.

When tape aperture 40 uncovers the open end of channel 49, conduit 18' communicates with pipe 48 by way of chamber 55, channel 54, and channel 49; driving gas expansion or driving gas withdrawal can then take place by way of pipe 48. While tape aperture 40 is uncovering the end of channel 49, channel 53 is substantially sealed off from conduit 18' by means of tape 6', since the latter has no aperture therein in lateral alignment with aperture 40.

It may be noted here that the tape aperture 8' is rectangular, to produce a sudden onset and sudden termination of the gas pressure pulse (applied to shock tube 18'), as required to set up a shock wave in the conduit 18'. On the other hand, the tape aperture 40 is V-shaped (with the apex of the V at the leading end thereof), as appropriate for the more gradual opening of the shock tube 18' (to the expansion connection 48) which is desired during the expansion portion of the cycle.

The aperture 40 is spaced from aperture 8' (along the length of the tape 6') in such a manner that aperture 40 comes into registry with the open end of channel 49 (and with the interior of the shock tube 18') a short time after the trailing edge of aperture 8' has traveled past the lower edge of the driving gas channel 53, at the open end of the latter. That is to say, the aperture 40 trails the aperture 8', referred to the direction 7 of tape travel. By way of example, the "short time" mentioned may be on the order of 0.3 millisecond.

In the valve assembly 1', 2' there is provided an arrangement for maintaining the tape 6' in an equilibrium position in its slot 41 as it travels therethrough. This arrangement is quite similar to that previously described in connection with FIGS. 1–6, and operates to in effect hydrostatically establish a thin gas film at each face of the tape, which is to say that a hydrostatic pad is established at each face of the tape; as a result, balanced hydrostatic pressures are applied to the two opposite faces of tape 6'.

For the block 1' side of the tape, the driving gas pressure exerted through channel 53 (acting on tape 6'), tends to push this tape toward block 2'; thus, a gas film is established on the block 1' side of the tape.

Block 1' has formed therein a horizontal transversely-extending cylindrical passage 12a which extends inwardly from the same side of this block as that into which pipe 11 is sealed, the passage 12a passing through channel 53 (and thus communicating therewith) and continuing on beyond this channel but bottoming short of the opposite (vertical) face of block 1'. The outer (open) end of passage 12a is provided with pipe threads into which is screwed a pipe plug 13a which closes off this end of the passage. Two bores 14a and 15a extend outwardly from the inner face of block 1' into communication with transverse passage 12a, one near each end of this passage; these bores are located beyond the confines of groove 5, one on either side thereof.

Outlet block 2' has formed therein a cylindrical passage 19a which is adapted to come into axial alignment with bore 14a when the blocks 1' and 2' are assembled together. Passage 19a extends horizontally from face 16a of block 2' toward the outer face of this block, the interior end of this passage opening into the side wall of a short transversely-extending cylindrical passage 20a which extends inwardly, from the same side of this block as that into which pipe 11 is sealed, toward the center thereof. The face 16a end of passage 19a is preferably counterbored as at 21a to a larger diameter for a small depth, thereby to provide an annular groove for accommodating an O-ring. The outer end of passage 20a is provided with pipe threads into which a pipe plug 22a is screwed to seal this end of the passage. Passage 19a opens into passage 20a at a location slightly inwardly from the aforementioned pipe threads.

The inner end of passage 20a opens into the side wall of a vertically-extending passage 23a, at a point intermediate the ends of the latter. Passage 23a, extends vertically completely through the block 2', from its upper face 24a to the bottom thereof, the respective opposite ends of this passage being provided with pipe threads into which are screwed respective pipe plugs 25a which close off the ends of the passage.

One end of a horizontally-extending cylindrical passage 26a opens into the side wall of passage 23a, above the center of the length thereof, and the other end of this passage opens into face 16a of block 2'. The center of passage 26a is located on a circle whose center is on an extension of the longitudinal center line of shock tube 18', and whose radius is such that the reduced-diameter end of passage 26a (to wit, that end adjacent face 16a) opens into the outlet side of tape slot 41, the outlet side being, of course, the same side of this slot as that into which channel 54 opens. The passage 26a has a counterbore or recess 27a at its face 16a end, has a reduced diameter for a short distance toward the passage 23a from this recess or counterbore, and has therein a threaded insert 29a carrying a critical-flow orifice 30a, all corresponding to the passage 26 in FIGS. 1–6 (refer to items 27, 29, and 30).

The center of passage 26a is located 45° around (in the clockwise direction, looking at face 16a as in FIG. 12) from a vertical radius passing through the center of the width of the slot 41, centered at the longitudinal center line of conduit 18'. This described location of the center of passage 26a on face 16a is such that neither of the tape apertures 8' or 40 will uncover passage 26a as the tape 6' travels through its slot 41, passage 26 therefore always "looking at" the imperforate portion of the "outlet" face of this tape.

When a pressured gas source is coupled by means of pipe 11 to block 1', a small leakage gas flow takes place through channel 53, transverse passage 12a, bore 14a, the axially aligned passage 19a, transverse passage 20a vertical passage 23a, horizontal passage 26a, and critical-flow orifice 30a into the outlet side of the tape slot 41. This gate flow results in a hydrostatic pressure force applied to the outlet side of tape 6' which opposes the hydrostatic pressure force applied to the inlet side of the tape as a result of the leakage gas flow directly through channel 53.

One end of a horizontally-extending cylindrical passage 31a opens into the side wall of passage 23a, below the center of the length thereof, and the other end of this passage opens into face 16a of block 2'. The center of passage 26a, and as a consequence the reduced-diameter end of passage 31a (to wit, that end adjacent face 16a) also opens into the outlet side of tape slot 41. The passage 31a has a counterbore or recess 32a' at its face 16a end, has a reduced diameter for a short distance toward the passage 23a from this recess or counterbore, and has therein a threaded insert 34a' carrying a critical-flow orifice 35a', all corresponding to the passage 31 in FIGS. 1–6 (refer to items 32, 34, and 35).

The center of passage 31a is located 90° around (in the clockwise direction, looking at face 16a as in FIG. 12) from the center of passage 26a. Passage 31a, like passage 26a, is not uncovered by either of the tape apertures 8' or 40 as the tape 6' travels through its slot 41, the passage 31a always "looking at" the imperforate portion of the "outlet" face of the tape.

When blocks 1' and 2' are joined together to form a block assembly as previously described, the small leakage gas flow reaching passage 23a from the short passage 20a splits; the portion of this flow which does not proceed through passage 26a proceeds into passage 31a and thence flows through critical-flow orifice 35a' into the outlet side of the tape slot 41. This last-mentioned gas flow, like that traveling through passage 26a, results in the application of a hydrostatic pressure force to the outlet side of tape 6'.

There has been described previously an arrangement of interconnected passages in block 2' which are fed from bore 14a in block 1', and which terminate in the two passages 26a and 31a both located on the same side (to wit, the lefthand side in FIG. 12) of a vertical line passing through the center of the width of tape slot 41. A quite similar but mirror image arrangement of interconnected passages is provided in block 2', for two passages 26a' and 31a' both located on the other side (to wit, the right-hand side in FIG. 12) of a vertical line passing through the center of the width of tape slot 41. Elements of the latter or right-hand arrangement which are similar to those of the left-hand arrangement are denoted by the same reference numerals, but carrying prime designations. This latter or right-hand arrangement of passages is fed from bore 15a in block 1', and provides gas flow from the passages 26a' and 31a' into the outlet side of the tape slot 41. The centers of passages 26a, 31a, 26a', and 31a' are all located on the same circle, the center of passage 26a' being located 90° around (in the clockwise direction in FIG. 12) from the center of passage 26a and the center of passage 31a' being located 90° around (in the same clockwise direction) from the center of passage 26a'.

Passages 26a' and 31a', like passages 26a and 31a previously mentioned, are not uncovered by tape apertures 8' or 40 as the tape 6' travels through its slot 41; the passages 26a' and 31a' always "look at" the imperforate portion of the "outlet" face of the tape.

A separate critical-flow orifice, similar to the orifices previously mentioned as being in passages 26a and 31a, is provided in each of the passages 26a' and 31a'.

The action of the arrangement described (in connection with FIGS. 7–12) for maintaining the tape 6' in an equilibrium position in its slot 41, as it travels therethrough, is quite similar to that previously described for the analogous arrangement of FIGS. 1–6. Summarizing, there is an essentially static centering action resulting from balanced static pressures on the "inlet" and "outlet" sides of the tape 6', and in addition there is a dynamic pressure-unbalancing effect (resulting from the actions of the shallow recesses or counterbores, and of the critical-flow orifices) which recenters the tape if it tends to move away from the center, toward either the "inlet" block 1' or the "outlet" block 2'.

Refer again to FIG. 13. Process gas (such as a mixture of methane and nitrogen, for example) is supplied from a suitable source through a valve 50 and a flowmeter 51 (indicated as being of the rotameter type) to a pipe 52, which leads to the outlet block 2'. The inner end of pipe 52 is sealed into the side wall of block 2', on the same side of the block assembly as pipe 11. The inner end of this pipe communicates with the outer end of a horizontally-extending channel 57 (see FIGS. 8 and 10) provided in block 2', channel 57 extending from the side wall of block 2' (adjacent pipe 52) toward the center of this block. At its inner end, channel 57 communicates with the upper end of a vertically-extending cylindrical bore 58 whose lower end opens into the upper wall of chamber 55 and which has a downwardly-facing beveled valve seat 59 at its lower end. A poppet-type valve, denoted generally by numeral 60, is mounted in bore 58, this valve being so arranged that the beveled face 61 of this valve mates with the seat 59, and the lower enlarged circular face of the valve forms a portion of the upper wall of chamber 55. In this connection, it is noted that a poppet valve, when closed, provides a smooth surface at its face end. The valve 60 is "open" when face 61 is pushed down, away from the seat 59; under these conditions, channel 57 is brought into communication with chamber 55 (and thus with conduit 18') by way of bore 58. When face 61 is in its uppermost position, in engagement with seat 59, valve 60 is "closed" tightly, cutting off any communication between chamber 55 and channel 57. Valve 60 is illustrated in its closed position in FIG. 10.

The integral stem 62 of valve 60 extends upwardly from face 61 to the outside of block 2' through a suitable bore provided in block 2', an O-ring seal 63 being utilized around stem 62 within block 2' for sealing purposes. Thus, a portion of the stem 62 extends above the upper face 24a of block 2'. Stem 62 is slidably mounted in its bore block 2'. A bore, extending upwardly from the lower face of block 2' into the chamber 55 and closed by a plug 97 (FIG. 10), may be used for assembling the integral stem and face of valve 60.

Valve 60 is operated to the open position by a camming arrangement to be described, and is returned to the closed position (being normally held in the latter position) by means of a return spring 64 having the form of a coiled compression spring one end of which bears against the block face 24a and the other end of which bears against a washer 65 which is fixedly secured to the upper end of stem 62. The spring 64 thus urges the stem 62 and valve face 61 upwardly, keeping the valve face in engagement with its seat 59.

The upper end of valve stem 62 is arranged to be contacted by the lower curved face provided at one end of a rocker arm 66 which is pivotally mounted as at 67 between a pair of upstanding brackets 68 firmly secured to the upper face 24a of block 2'. When this one end of the arm 66 moves downwardly, it pushes stem 62 downwardly, moving the valve face 61 away from seat 59, thus opening valve 60. The arm 66 is pivoted at a point intermediate its two ends.

The end of rocker arm 66 oposite to the end previously mentioned (i.e., opposite to the valve stem 62) is pushed upwardly in a periodic, repetitive fashion (thereby to open the valve 60) by a cam-operated arrangement driven from drive motor 42. A camshaft 69, which is journaled for rotation in a suitable manner and whose axis extends parallel to the center line of shock tube 18', is driven from shaft 39 through a gear box 70 having associated therewith a manually-variable phase adjustment means 71 for varying the angular relation between shafts 69 and 39. Camshaft 69 carries a cam disc 72 against which bears the lower end of an actuating rod 73 whose upper end engages a lower face provided at that end of rocker arm 66 which is opposite to the end thereof cooperating with valve stem 62. Rod 73 extends from the cam disc 72, which may be located below the shock tube 18' and the block assembly 1', 2', up through the outlet block 2' to a point above the upper face 24a thereof, such that it can engage rocker arm 66 as described. Rod 73 is mounted for reciprocatory (sliding) movement in the outlet block 2'.

It may be observed that the raised or camming portion of disc 72 pushes rod 73 upwardly, rocking the rocker arm 66 about its pivot to push valve stem 62 downwardly against the opposition of return spring 64, thereby opening the poppet valve 60. When this valve is open, gas can flow from the process gas source (which is coupled to pipe 52) to shock tube 18', by way of channel 57, bore 58, and chamber 55. This opening of the valve 60 occurs repetitively and periodically, as disc 72 is rotated by shaft 69 in a continuous fashion.

When the raised or camming portion of disc 72 passes beyond the lower end of rod 73, this rod is no longer pushed upwardly (but, on the other hand, is released for downward movement), and then the return spring 64 pushes upwardly on valve stem 62 to close the valve 60 and return the pivoted rocker arm 66 and reciprocating rod 73 to their non-operated positions. Of course, when valve 60 is closed, the process gas source is cut off from shock tube 18', since the valve face 61 then forms a tight seal against its seat 59.

For "double-ended" shock tube operation, the items previously described in connection with FIG. 13 would be duplicated (but in mirror image fashion) at the far end (not shown) of the elongated hollow conduit (shock tube) 18'. Thus, a duplicate block assembly 1', 2' would be utilized, together with a duplicate driven doubly-apertured tape, a duplicate poppet valve for the process gas, duplicate piping, etc. The tape drive at the far end of the tube would necessarily have to be synchronized with that at the near end (illustrated), but this would not be too difficult to accomplish; the necessary synchronization of the two poppet valves could be effected by using the same camshaft 69 for both.

Figure 14:
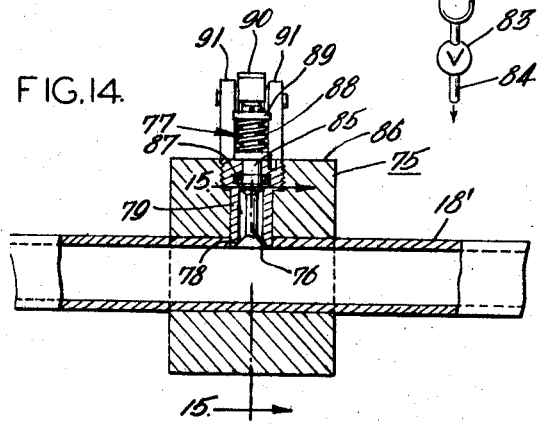
FIG. 14 is a vertical sectional view of another valve block utilized in the system of FIG. 13.
Figure 15:
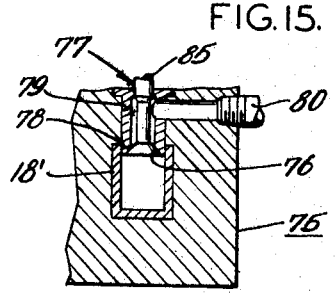
FIG. 15 is a fragmentary section taken on line 15—15 of FIG. 14.

Refer now to FIGS. 13-15. At the center of the length of the elongated conduit 18', a prismoidal valve block 75 is sealed to the wall of this conduit in such a way that the conduit passes directly through the block. The block has a straight aperture extending entirely therethrough to accommodate the conduit 18', the conduit 18' being sealed into this aperture. Within the confines of block 75, an aperture is cut through the upper wall of conduit 18'. In this aperture is disposed the lower portion of a vertically-extending sleeve 79 which has at its lower end a downwardly-facing beveled valve seat 76. A poppet-type valve, denoted generally by numeral 77, is mounted within sleeve 79, the beveled face 78 of this valve mating with the seat 76. The lower enlarged circular face of valve 77, together with the lower end face of sleeve 79, form a portion of the upper wall of conduit 18' (see FIG. 14); a poppet valve, when closed, provides a smooth surface at its face end. Valve 77 may be generally similar to valve 60, previously described, and, like valve 60, is "open" when face 78 is pushed downwardly, away from seat 76, and is "closed" when face 78 is in engagement with its seat. In FIGS. 14 and 15, valve 77 is illustrated in its closed position.

Sleeve 79 is of enlarged diameter at its upper end, and the upper end portion of this sleeve carries male threads which mate with the threads provided in a counterbored-and-tapped aperture which extends vertically downward from the upper face 86 of block 75 to the straight aperture provided in block 75 for conduit 18'. By means of this threaded coupling, sleeve 79 is secured in the aforesaid counterbored-and-tapped aperture in block 75.

The bore of sleeve 79 communicates with the interior of conduit 18' when valve 77 is open. One end of a "products out" pipe 80 is sealed through a side wall of block 75, into communication with the aforesaid sleeve bore. The other end of pipe 80 is connected through a valve 81 to one end of a suitable product collection bottle 82, and the other end of this bottle is connected through a valve 83 to a product withdrawal pipe 84. The pipe 84 leads to a suitable product utilization means. When valve 81 is open and valve 83 closed, products may be removed from conduit 18' (when valve 77 opens), and may be collected in the bottle 82. When valve 81 is closed and valve 83 open, products may be withdrawn from bottle 82 via pipe 84, for utilization of the same.

The integral stem 85 of valve 77 extends upwardly from face 78 to a point above the upper face 86 of block 75, through the bore of sleeve 79, an O-ring seal 87 being utilized around stem 85 within the upper end portion of sleeve 79 for sealing purposes. Stem 85 is slidably mounted in the aforesaid bore.

Valve 77 is operated to the open position by a camming arrangement to be described, and is returned to the closed position (being normally held in the latter position) by means of a return spring 88 having the form of a coiled compression spring one end of which bears against the block face 86 and the other end of which bears against a washer 89 which is fixedly secured to stem 85. The spring 88 thus urges the stem 85 and valve face 78 upwardly, keeping the valve face in engagement with its seat 76.

The upper end of valve stem 85 is arranged to be contacted by the lower face provided at one end of a rocker arm 90 which is pivotally mounted between a pair of upstanding brackets 91 firmly secured to the upper face 86 of block 75. Arm 90 is pivoted at a point intermediate its two ends. When said one end of arm 90 moves downwardly, it pushes stem 85 downwardly, moving the valve face 78 away from seat 76, thus opening valve 77.

Camshaft 69 also carries a cam disc 92 against which bears the lower end of an actuting rod 93 whose upper end engages that end of rocker arm 90 which is opposite to the end thereof cooperating with valve stem 85. Rod 93 extends from the cam disc 92 up through the block 75 to a point above the upper face 86 thereof, such that it can engage rocker arm 90 as described. Rod 93 is mounted for reciprocatory (sliding) movement in block 75.

The raised or camming portion of disc 92 pushes rod 93 upwardly, rocking the rocker arm 90 about its pivot to push valve stem 85 downwardly against the opposition of return spring 88, thereby opening the poppet valve 77. When this valve is open, gaseous products can flow from conduit 18' to the "products out" pipe 80, and to bottle 82 if valve 81 is then open. Of course, this opening of valve 77 occurs repetitively and periodically, as disc 92 is rotated by shaft 69 in a continuous fashion.

When the raised or camming portion of disc 92 passes beyond the lower end of rod 93, the return spring 88 closes valve 77. This action is quite similar to that previously described in connection with valve 60.

Refer now to FIGS. 16-22, which are diagrammatic views illustrating various successive (and different) steps of a typical process utilized in a wave reactor employing the quick-acting valve (tape valve) of this invention, and more particularly the two-aperture-tape arrangement of FIGS. 7-13. For simplicity, only one-half of the shock tube 18' is illustrated in these figures, thus implying "single-ended" operation. However, "double-ended" operation is generally preferred, in actual practice. The "single-ended" operation to be explained can easily be converted to "double-ended" if it is remembered that in the latter the "shock," "expansion," and "charge" take place simultaneously at the two ends of the tube, and the products are removed from the center of the tube. Refer to my prior patent previously cited. However, the process being described herein differs slightly from that described in said patent, in that in the present process the products are removed from the center of the tube and the "charge" is to the two ends of the tube, rather than vice versa as in the said patent.

Figure 16:
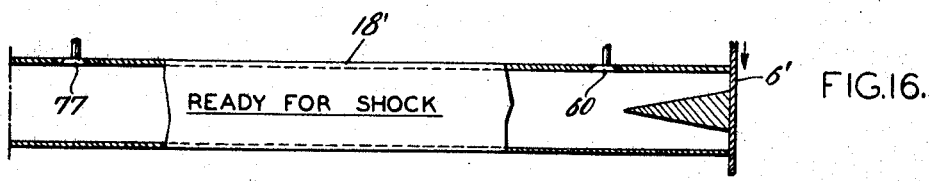
FIGS. 16–22 are schematic views, partly in section, illustrating different steps or stages in a wave reactor cycle of operation.

FIG. 16 illustrates the "ready for shock" step. It is assumed that the stationary hollow conduit (shock tube) 18' has previously been charged with process gas (how this charging is effected will be described hereinafter, in connection with FIG. 21), so that the tube is ready to be shock-excited. Poppet valves 60 and 77 are both closed, and the "blank" or unapertured portion of the tape 6' covers both the driving gas channel 53 and the expansion channel 49 (FIG. 7).

Figure 17:
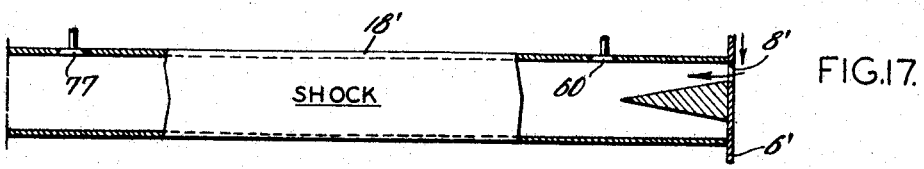
Figure 18:
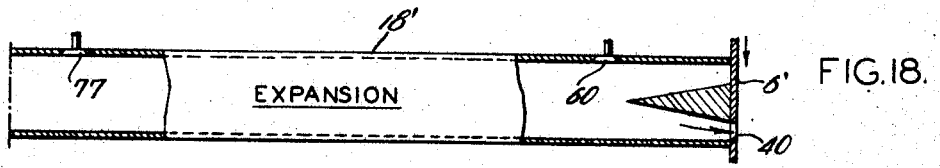

FIGS. 16 through 22 are arranged to portray the conditions at successive instants of time, so that FIG. 17 follows in time FIG. 16, FIG. 18 follows FIG. 17 in time, and so on.

A short time after the instant depicted in FIG. 16, the "shock" step illustrated in FIG. 17 takes place. Tape aperture 8' comes into registry with the driving gas channel 53, pulsing the driving gas into condut 18' and setting up a shock wave therein. Valves 60 and 77 remain closed.

A short time later, tape aperture 8' has passed by the inner end of channel 53, and tape aperture 40 comes into registry with the expansion channel 49, setting up the "expansion" step illustrated in FIG. 18. During this expansion portion of the cycle, valves 60 and 77 remain closed.

Figure 19:
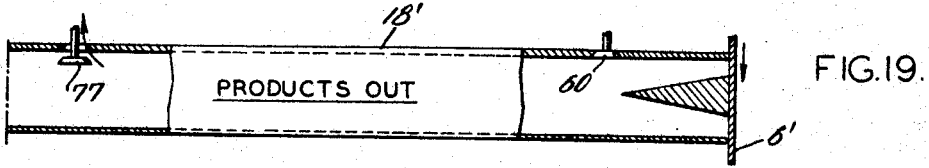

Tape aperture 40 completes its passage by the inner end of channel 49 to terminate the expansion step, and thereafter valve 77 is cammed open to initiate the "products out" step of FIG. 19. Gaseous products are withdrawn from the center of the tube 18' by way of the open valve 77. Valve 60 remains closed, and the "blank" portion of the tape 6' covers both the driving gas and expansion channels in block 1'.

Figure 20:
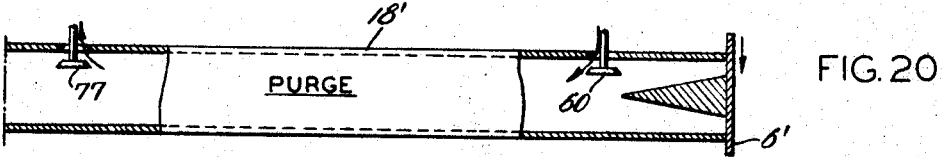

Thereafter, valve 60 is cammed open, with valve 77 remaining open, thereby to set up the "purge" portion of the cycle, illustrated in FIG. 20. The driving gas and expansion channels are still masked off by the unapertured portion of tape 6'. Process gas now flows into the tube 18' via valve 60, to purge the remaining products out of the tube via valve 77.

Figure 21:
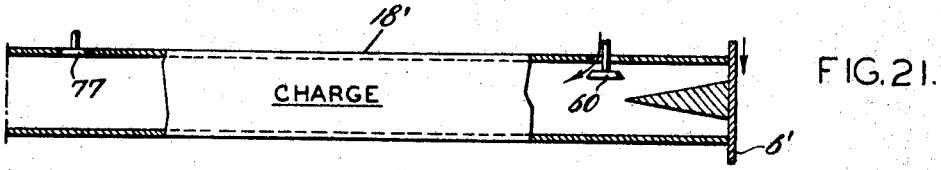

A short time later, valve 77 closes (valve 60 remaining open), to "charge" the tube with new process gas, as illustrated in FIG. 21. The tape 6' continues to mask off the driving gas and expansion channels.

Figure 22:
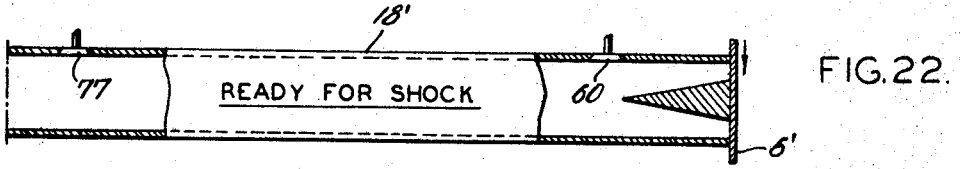

Finally, the proper amount of new process gas has been charged into the tube, and valve 60 then closes to reestablish the "ready for shock" condition, as illustrated in FIG. 22; FIG. 22 is a duplicate of FIG. 16, as will be noted. The next cycle of operation can then begin with the "shock" step illustrated in FIG. 17.

By way of example, the length of the tape loop 6', and the speed of travel of this tape, may be such that one complete passage of the tape through its slot 41 takes 120 milliseconds. Three shocks per length of the tape (which would mean three complete process cycles, FIGS. 16 through 21 illustrating one complete cycle) would allow forty milliseconds for each complete cycle, which is a suitable length of time for this. Three shocks per passage of the tape would of course mean that there would be three apertures 8' in the tape loop 6', spaced equidistantly around the length thereof, as well as three expansion apertures 40, each located appropriately with respect to a respective shock aperture 8'.

Although the expansion portion of the cycle has been described hereinabove as utilizing the tape aperture 40 for valving, it may be desirable in some instances to use a poppet valve for the expansion, instead of the tape. To do this, the tape aperture 40 would be eliminated, and a poppet valve similar to valves 60 and 77 would be used for the valving of the expansion passage 49. This would be an obvious modification of the detailed structure previously described.

In connection with the expansion portion of the cycle, it is possible during the expansion stage to take the expansion gas out of the shock tube at high pressure and drop the pressure thereof through any suitable mechanical recovery unit, such as turbine blading, in order to recover power from this high pressure gas, thus increasing the overall efficiency.

Figure 23:
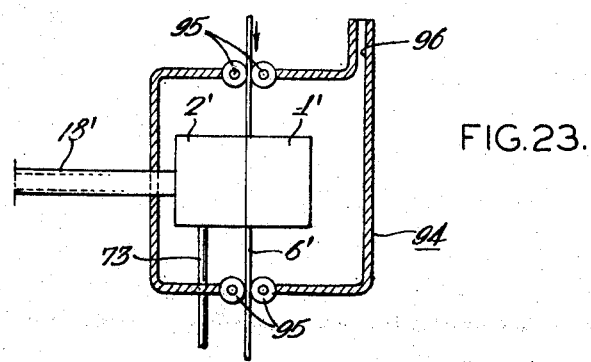
FIG. 23 is a sectional view illustrating a vented housing.

It will be recalled that the hydrostatic pads produced on opposite faces of the tape 6' (which is to say, the thin gas films established at each face of the tape) are the result of controlled leakage (of the driving gas) on both faces of the tape. It may be desirable to recover (for re-use) this leakage gas, or to vent this leakage gas in a safe manner (particularly if a flammable gas such as hydrogen is used as the driving gas). FIG. 23 illustrates one way in which this can be accomplished.

Referring to FIG. 23, a housing 94 is provided around block assembly 1', 2'. The conduit 18' extends outwardly from the block assembly and is fixedly sealed through a side wall of the housing, as illustrated. The pipes 11, 48, and 52 (not shown in FIG. 23) would be fixedly sealed through the housing side wall, similarly to conduit 18'. The actuating rod 73 for valve 60 is slidably sealed through the bottom wall of housing 94. The tape loop 6' moves into and out of the housing 94 by way of low pressure wiping seals 95. Housing 94 is provided with a single vent opening 96, by means of which the leakage gas flowing into this housing from the block assembly 1', 2' may be vented in a proper and approved manner. Or, instead of being vented, the leakage gas may be recovered for re-use by way of the opening 96.

It has been conceived that it may be possible to program the entire cycle of operation of the wave reactor described by the use of tape 6'. In order to do this, the tape loop would contain, in addition to the apertures 8' and 40, information for controlling the operation of the poppet valves 60 and 77. Tape 6' could have a magnetic coating, in which case the valve-controlling information would be magnetically recorded thereon. Or, the tape could be made of a more conventional material, with the valve-controlling information in the form of perforations in the tape.

A separate pickup for each valve to be operated would be utilized, these pickups being mounted so as to cooperate with the tape and being arranged so that they could be adjusted to various different positions with respect to fixed pulleys 36 and 37, in the direction of tape travel. The pickups would obviously be of a type appropriate to the particular type of tape being used, whether perforated or magnetic. In any case, the valve-controlling information carried by the tape would be converted by the pickups into electrical signals of a suitable type, which would then be amplified.

In the tape-programmed reactor, the poppet valves, instead of being mechanically operated (by means of cams, as described hereinabove), would be operated by means of solenoids. The electrical signals obtained from the pickups, after being amplified, would be applied to the solenoids to operate (open) the appropriate poppet values, in accordance with the valve-controlling information derived by the pickups from the tape.

The program could be changed by merely adjusting the pickups in the direction of tape travel, to the desired position. Also, various different tapes could be provided, each with a different built-in programs; if this were done, a different tape could be substituted for the one being used, in order to change the program.

The invention claimed is:

1. In combination, a block, an elongated hollow conduit having one end sealed into said block; a tubular element having one end sealed into said block in alignment with said one end of said conduit, said element conveying gas under superatmospheric pressure; an impervious sealing member whose width is large compared to its thickness fitting with small face clearances in a channel provided in said block which channel extends in a direction transverse to the length of said conduit, in a location between said one end of said element and said one end of said conduit, said member having an aperture therein which is arranged to come into registry with said element and said conduit to couple said element to the interior of said conduit; and means including said element for applying pneumatic pressure to the front and rear faces of said member to substantially center said member with respect to the front and rear walls of said channel.

2. Combination in accordance with claim 1, wherein said pressured gas element opens into one wall of said channel to constitute a part of said means, and wherein said means also includes a fluid passage communicating with said pressured gas element and opening into that wall of said channel which is opposite to said one wall thereof.

3. Combination of claim 2, including also means providing an orifice in said fluid passage sized to establish critical flow conditions therethrough.

4. Combination as set forth in claim 1, wherein said member is made from a strip of flexible material in the form of an endless loop; said combination including also means for driving said loop in a continuous manner through said channel so that said aperture repetitively comes into registry with said element and said conduit.

5. In combination, a block, an elongated hollow conduit having one end sealed into said block; a tubular element having one end sealed into said block in alignment with said one end of said conduit, said element conveying gas under superatmospheric pressure; a vented housing surrounding but spaced from said block and sealed to the outside of said conduit and said element, said housing being provided with a pair of oppositely-disposed seals extending through the wall thereof; an impervious sealing member fitting with small face clearances in a channel provided in said block which channel extends in a direction transverse to the length of said conduit, in a location between said one end of said element and said one end of said conduit, said member extending sealingly through said pair of seals and having an aperture therein which is arranged to come into registry with said element and said conduit to couple said element to the interior of said conduit; and means associated with said block for maintaining said member substantially centered in said channel, said means including said element as a part thereof.

6. Combination according to claim 5, wherein said means operates by applying pneumatic pressure to respective opposite faces of said member.

7. Combination as set forth in claim 5, wherein the width of said member is large compared to its thickness, and wherein said means applies pneumatic pressure to the front and rear faces of said member to substantially center said member with respect to the front and rear walls of said channel.

8. Combination in accordance with claim 5, wherein said pressured gas element opens into one wall of said channel to constitute a part of said means, and wherein said means also include a fluid passage communicating with said pressured gas element and opening into that wall of said channel which is opposite to said one wall thereof.

9. Combination of claim 8, including also means providing an orifice in said fluid passage sized to establish critical flow conditions therethrough.

10. Combination in accordnace with claim 5, wherein said pressured gas is a driving gas; the coupling of said conduit to said element by means of said aperture causing the setting up by said driving gas of a shock wave in said conduit.

11. Combination as set forth in claim 5, wherein said member is made from a strip of flexible material in the form of an endless loop; said combination including also means for driving said loop in a continuous manner through said channel and through said housing and seals, so that said aperture repetitively comes into registry with said element and said conduit.

References Cited

UNITED STATES PATENTS 3,064,682   11/1962   Holzbock _____ 251—282 X
3,198,084   8/1965   Hague.
3,270,960   9/1966   Phillips _____ 235—201

OTHER REFERENCES

I.B.M Technical Disclosure Bulletin, S. Kambic, et. al., Pneumatic Chadless Tape Reader; volume 8, No. 4, September 1965, p. 564.

ALAN COHAN, Primary Examiner

U.S. Cl. X.R.

137—624.18; 251—282; 235—200